United States Patent [19]

Noguchi

[11] Patent Number: 4,953,807

[45] Date of Patent: Sep. 4, 1990

[54] STATIONARY TAPE GUIDE FOR A MAGNETIC TAPE RECORDER

[75] Inventor: Yoshihiro Noguchi, Tokyo, Japan

[73] Assignee: Nakamichi Corporation, Tokyo, Japan

[21] Appl. No.: 267,488

[22] Filed: Nov. 4, 1988

[30] Foreign Application Priority Data

Nov. 6, 1987 [JP] Japan .......................... 62-169939[U]

[51] Int. Cl.⁵ ...................... B65H 23/10; B65H 27/00
[52] U.S. Cl. ......................................... 242/76; 242/76
[58] Field of Search ................... 242/76; 226/196, 197, 226/199; 360/130.2, 130.21

[56] References Cited

FOREIGN PATENT DOCUMENTS 171667 9/1985 Japan .............................. 360/130.21
253053 12/1985 Japan .

Primary Examiner—Stuart S. Levy
Assistant Examiner—Paul T. Bowen
Attorney, Agent, or Firm—Klein & Vibber

[57] ABSTRACT

A stationary tape guide, for use with a magnetic tape recorder having an inclined cylinder mounted on a chassis, the tape-guide containing a guide block mounted on the chassis the guide block having the following features. A first tape surface guide inclined with respect to a first reference plane. A second tape surface guide inclined with respect to the first reference plane and located further from the inclined cylinder than the first tape surface guide. A third tape surface guide oriented orthogonal to the first reference plane and located further from are inclined cylinder than the second tape surface guide. A first tape edge guide extending from the guide block beyond a second reference plane defined by the first and second tape surface guides and having a first tape edge contact surface. A second tape edge guide extending from the guide block beyond a third reference plane defined by the first tape surface guide in cooperation with the cylinder, and having a second tape edge contact surface which is located further from the first reference plane than the first tape-edge contact surface.

6 Claims, 2 Drawing Sheets

STATIONARY TAPE GUIDE FOR A MAGNETIC TAPE RECORDER

FIELD OF THE INVENTION

The present invention relates to an improvement in a stationary tape guide to be disposed in close proximity to a cylinder having a rotary head and having a first tape-edge guide means.

BACKGROUND OF THE INVENTION

In a magnetic tape recorder which may store and reproduce information by helical scanning, it is common to provide a cylinder, having a rotary head, inclining to a horizontal reference plane (for example, a top surface of a chassis) which is perpendicular to rotational axes of tape reels. When such a cylinder is utilized, a pair of tape pull-out means are required to pull out a tape from a tape cassette and to wind the tape around the cylinder for a predetermined angle (hereinafter this operation will be called a tape-loading operation).

In this connection, it has been known that when a tape is transferred by keeping the tape surfaces orthogonal to a reference plane and at the same time by keeping the tape edges parallel to the reference plane, and is contacted with a cylinder surface which is inclined to said reference plane, the orientation of the surfaces and edges of said tape with respect to the reference plane are varied.

There is a known tape pull-out means which has two guide pins, one is inclined and the other is oriented orthogonal to a reference plane, mounted on a carrier movable between a home position adjacent to a tape reel and a pulled-out position or a loading position adjacent to a cylinder. More particularly, the inclined pins may change the orientation of the surfaces and edges of said tape with respect to the reference plane upstream and downstream of said cylinder so that the tape surfaces orthogonal to said reference plane are changed into nonorthogonal (in upstream position) or vice versa (downstream) and that tape edges which are parallel to the reference plane are changed into nonparallel (upstream) or vice versa (downstream). When the pull-out means are moved, however, the inclined guide pins are contacted with the tape surfaces, and a force to move the tape in the direction of its width is generated. This force may cause a shift of the tape, and movement of the tape away from the cylinder may result in a failure to pull out the tape.

A tape pull-out means having a plurality of inclined pins is disclosed in Japanese Unexamined Patent Application Gazette No. 60(1985)-253053. The use of a plurality of inclined pins necessitates accurate adjustment of relative inclination between the pins and the associated cylinder in manufacturing and installation. In order to reduce the troublesome adjustment of the relative inclination, it is proposed, in this reference, to form two inclined pins in one block.

However, the tape pull-out means having one or more inclined pins on a movable carrier has the defect of requiring accurate installation and positioning at their pulled-out positions. Inaccuracy in installation or positioning may result in inaccuracy in winding the tape on the inclining pin for a predetermined angle which in turn results in inaccuracy of the angle between the tape surface and a reference plane, and inaccuracy of the distance between the tape edges and the reference plane. This problem cannot be solved even if guide blocks each having one or more inclined pins are fixedly disposed in close proximity of a cylinder as a stationary guides, since inaccuracy of the positions of the pull-out pins may result in inaccuracy in winding the tape on said inclined pin in desired angles.

The solution of this problem is disclosed in the U.S. patent application Ser. No. 154,265 filed on Feb. 10, 1988 now U.S. Pat. No. 4,875,126, by Niro Nakamichi and assigned to the same assignee of the present invention. In this application, there is disclosed a stationary tape guide having a laterally extending guide path, the general contour of which is forwardly convexed on a projection on a horizontal reference plane. At least two straight guide projections are inclined to said reference plane and a single straight guide projection extending orthogonal to said reference plane is serially and integrally provided on a guide block. In the preferred embodiments in said application, the tape guide is further provided with means for guiding the upper edge of a tape integrally or detachably therewith.

In Japanese Utility model Application No. 62(1987)-175168 which was filed by the same assignee of the present application on Nov. 17, 1987, a stationary tape guide having a tape-edge guide which determines the level of the guide surface is disclosed.

The tape guide disclosed in the application may adequately operate, however, a tape wound along an inclined cylinder tends to shift in its axial direction in operation due to the inclination of the cylinder. This tendency is increased when a tape is transferred on a wet or moisturized surface of an inclined cylinder rotating in operation or on a surface of an inclined cylinder non-rotated in malfunction of magnetic tape recorder. When the tape is axially shifted and rides on or leaves off the tape-edge guide, the tape is damaged.

SUMMARY OF THE INVENTION

Therefore, it is an object of the present invention to improve the stationary tape guide by having a first and a second inclined ridge and a third orthogonal ridge for guiding a tape-surface and a means for guiding the upper edge of tape.

In accordance with the present invention, at least an additional tape-edge guide means is provided above a first guide plane defined by a first inclined ridge and an inclined cylinder. When the tape tends to ride on the first tape-edge guide, lateral shift of the tape is inhibited by the additional tape-edge guide, and thus the damage of the tape can be minimized. The additional tape-edge guide does not disturb the tape-loading operation.

In accordance with another preferred embodiment, a first tape-edge guide is so improved that the surfaces adjacent to the guide surface of the first tape-edge guide and extending from the guide surface in the direction departing from the reference plane incline to the reference plane to have acute interior angles therebetween. The inclined adjacent surfaces may shift back the tape to its normal tape-transferring path when the tape rides on the inclined adjacent surfaces.

In accordance with a further preferred embodiment, edges formed between the edge guide surface and the inclined adjacent surfaces are rounded to minimize the damage to the tape when it rides on the inclining adjacent surfaces.

In accordance with a still further embodiment, the additional tape-edge guide is provided with a downwardly extending portion at its front end so as to form an inverted U shaped groove. The distance from the reference plane to the lower end of the downwardly extending portion is made equal to or longer than the distance from the reference plane to the guide surface of the first tape-edge guide. The downwardly extending portion may inhibit the tape from shifting off the additional tape-edge guide.

In accordance with a further embodiment of the present invention, the tape-guide block is provided with tape detecting means at the area of the tape-guide path so that a signal is generated when the tape is shifted off the tape-guide path. This signal is utilized, for example, to turn off the power switch of the tape recorder to thereby minimize damage to the tape.

BRIEF DESCRIPTION OF THE DRAWINGS

With these and other objects in view, which will become apparent in the following detailed description, the present invention, which is shown by example only, will be clearly understood in connection with the accompanying drawings, in which.

DETAILED DESCRIPTION OF PREFERRED EMBODIMENTS OF THE INVENTION

Figure 1:
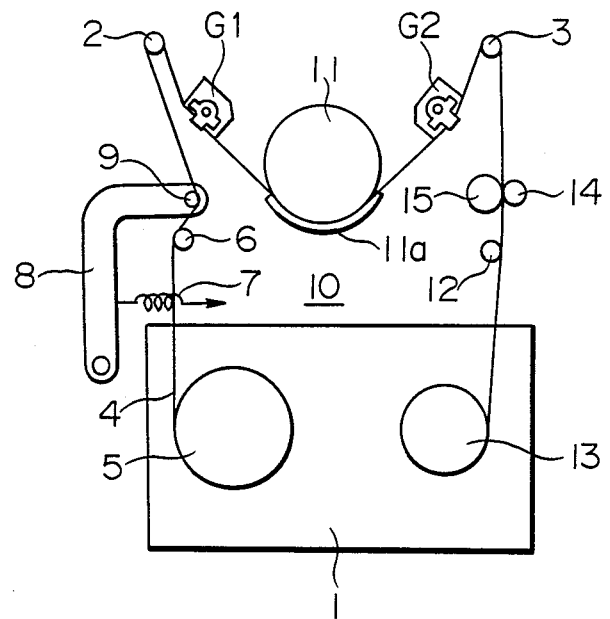
FIG. 1 generally shows a tape transferring path in a magnetic tape recorder in which a pair of stationary tape guides in accordance with the present invention are installed.

Referring to FIG. 1, there is shown a tape transferring path in a magnetic tape recorder in which a pair of tape guides G1 and G2 in accordance with the present invention are installed. Tape 4 which is pulled out of cassette 1 by a pair of pull-out pins 2 and 3 is led from reel 5 via guide rollers 6 to stationary tape guide G1, which is fixed on a chassis or a reference plane 10. Tension pole 9 is mounted on arm 8 biased with spring 7 for absorbing variations in tape tension. The stationary tape guide G1 contacts with the tape surface on which magnetic material is coated.

Tape 4 led from guide G1 is helically wound along a cylinder 11 which has a rotary head (not shown) and is inclined to the reference plane (or chassis) 10 at a predetermined angle. Cylinder 11 has a stationary lead 11a which guides the lower edge of the tape 4.

Tape 4 is guided from cylinder 11 by stationary tape guide G2, and is led to reel 13 via pull-out pin 3 and guide roller 12. Capstan 14 and pinch roller 15 cooperate in transferring tape 4 along the path as described and shown in FIG. 1.

When tape 4 arives at and leaves from cylinder 11, the tape surfaces are not orthogonal to reference plane 10 and the tape edges are not parallel thereto. Tape guide G1 orients the surfaces and edges of tape 4 which heretofore are kept orthogonal and parallel respectively to reference plane 10 into nonorthogonal and nonparallel to the reference plane, and tape guide G2 orients the surfaces and edges of tape 4 kept nonorthogonal and nonparallel to reference plane 10, back into orthogonal and parallel posture respectively.

Figure 2:
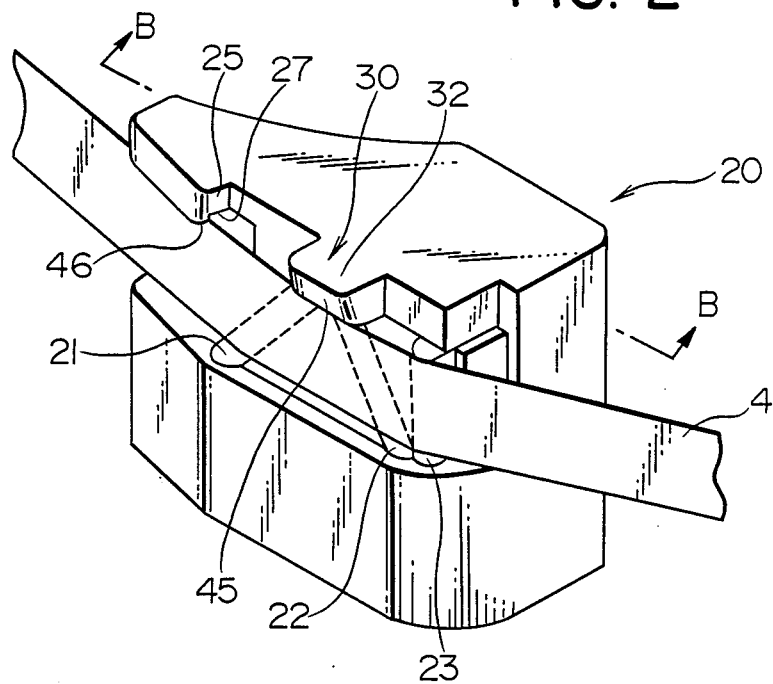
FIG. 2 is a perspective view of a stationary tape guide G2 to be disposed downstream of the cylinder in accordance with an embodiment of the present invention in which securing means are omitted.
Figure 3:
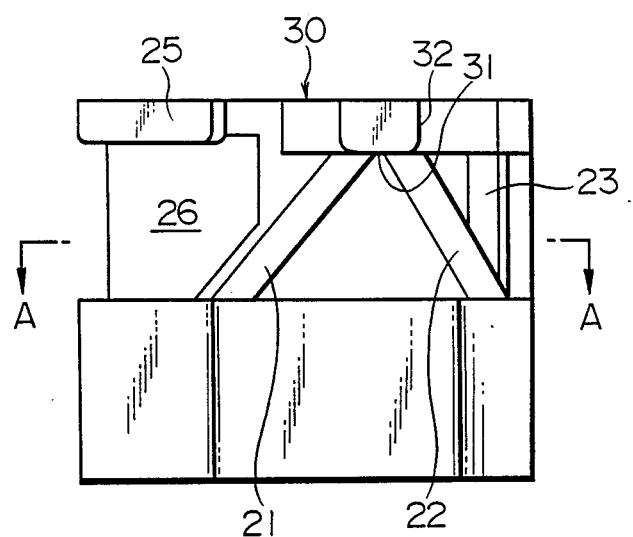
FIG. 3 is a front view of the embodiment of FIG. 2.
Figure 4:
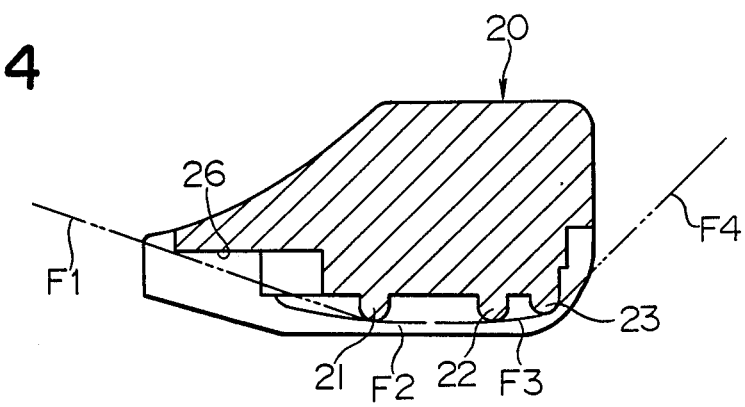
FIG. 4 is a cross section taken along the line A—A of FIG. 3.
Figure 5:
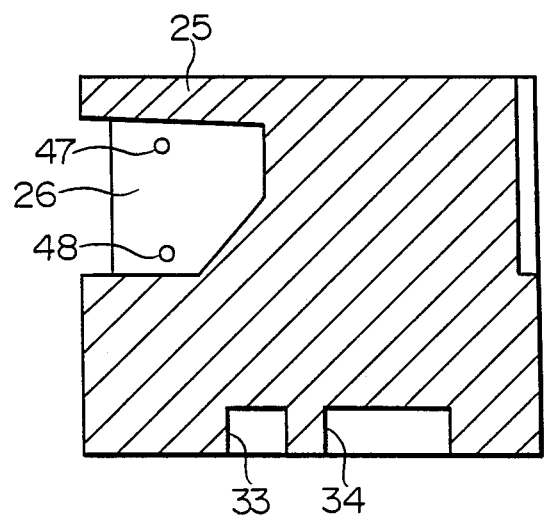
FIG. 5 is a cross section taken along the line B—B of FIG. 2 with securing means being added.

FIG. 2 shows a perspective view of tape guide G2 disposed downstream of cylinder 11 of FIG. 1 in operation (wherein securing means for connecting tape guide G2 to chassis 10 is omitted). FIGS. 3-5 show, respectively, a front view, a cross section taken along the line A—A in FIG. 3, and a cross section taken along the line B—B in FIG. 2 with addition of the securing means.

Tape guide G2 comprises a block 20 on which a laterally extending guide path for tape 4 is provided. Along the guide path, a first tape-surface guide 21, a second tape-surface guide 22 and a third tape-surface guide 23 are serially and integrally formed. First to third tape-surface guides 21-23 are shown as straight ridges each having semi-circular cross section (cf. FIG. 4). First and second tape-surface guides 21 and 22 are oriented so as to incline to chassis 10 at predetermined acute angles respectively when tape guide G2 is secured to chassis 10. Third tape-surface guide 23 is oriented orthogonal to chassis 10 when tape guide G2 is secured thereto.

With reference to FIG. 4, tape-surface guide 21 to which tape 4 led from cylinder 11 first contacts defines a first guide plane F1 in cooperation with cylinder 11. Tape-surface guides 21 and 22 define a second guide plane F2. Second and third tape-surface guides 22 and 23 define a third guide plane F3. Third tape-face guide 23 defines fourth guide plane F4 in cooperation with pull-out pin 3 at its pulled-out position. It should be noted that the edges of tape 4 located on guide planes F1 and F2 are nonparallel to chassis 10, and surfaces of tape 4 located on guide planes F1 and F2 are nonorthogonal to chassis 10. The edges and surfaces of tape 4 led from cylinder 11 via guide planes F1 and F2 are oriented back to parallel and orthogonal to chassis 10 on guide plane F3. The features described hereinabove are the same with those described in the aforementioned U.S. application by N. Nakamichi.

In accordance with the present invention, stationary tape guide G2 is provided with an additional tape-edge guide means. In this embodiment, additional edge-guide means comprises a flange 25 forwardly extending from the guide block 20 beyond the first guide plane F1 above the lateral guide path. It is preferable that the forwardly extending length of flange 25 is longer than the forwardly extending length of a first tape-edge guide 30 which will be explained hereinafter. For this purpose, in the embodiment shown in FIGS. 2-5, a deep cut-away portion 26 is formed on the guide block 20. The lower surface of flange 25 may function as a second tape-edge guide surface 27.

The first tape-edge guide 30 comprises a projection 32 having a lower surface functioning as tape-edge guide surface 31. The first tape-edge guide surface 31 (FIG. 3) opposite to the reference plane 10 with intervention of second guide plane F2 defined with the first and second tape-surface guide 21 and 22, and extending from the guide block beyond the guide plane F2 to restrict the upward shifting of the tape 4. In the embodiment shown in FIGS. 2-5, first edge guide 30 is shown as being integrally formed with the guide block 20. The distance between second tape-edge guide surface 27 and reference plane 10 is longer than the distance between first tape-edge guide surface 31 and reference plane 10. Thus the upper edge of tape 4 would contact with first tape-edge guide surface 31 and would not contact with second tape edge guide surface 27 in the normal operation. It will be apparent to those skilled in the art that the geometry of first and second tape-edge guide 30 and 25 can be modified so that the level of first and second edge guide surfaces 31 and 27 can be adjusted by a suitable means, for example, by the mechanism disclosed in the aforesaid U.S. patent application by N. Nakamichi.

As shown in FIG. 5, tape guide G2 of the present invention can be secured to a chassis 10 by any known securing means. In this particular embodiment, force fitting is adopted. More particularly, guide block 20 is provided with a pair of recesses 33 and 34 on its bottom surface which are suited to tightly recieve the corresponding projections (not shown) formed on the chassis 10. When the force fitting is adopted, it is preferable to provide a supporting structure (not shown) for supporting the rear surface of guide block G2 against pushing force applied to block 20 by tape 4. The pair of recesses 33 and 34 and the corresponding projections provide a definite and accurate positioning of stationary tape guide G2 and reliable support in conjunction with the backing structure. It should be noted, however, that securing means are not limited to the embodiment illustrated and described, and that any other securing means well known in the art can be utilized.

The structure of tape guide G1 is the same with the tape guide G2, except that the straight ridges or tape-surface guides 21–23 are reversely arranged and tape-face guides 21 and 22 are reversely oriented in V shape as compared with tape guide G2 in which tape-surface guide 21 and 22 are arranged in the form of an inverted V. More precisely, guide plane F2 which is defined by tape-surface guides 21 and 22 is inclining in such a manner that the upper edge of the guide plane F1 overhangs in tape guide G2, whereas guide plane F2 inclines in such a manner that the upper edge of plane F2 is backwardly shifted in tape guide G1. This will be apparent from the foregoing descriptions.

It will be noted in FIG. 2 that the front surface 45 of first tape-edge guide 30 is inclined so that the upper edge thereof forwardly overchangs so that tape 4 which rides on the front surface is shifted back to its normal guide path. In the embodiment shown in FIGS. 2-5, first tape-edge guide 30 is shown as a rectangular projection 32 having a slanted front face 45, however, the geometry of the projection can be modified as far as it has a tape-edge guide surface 31 facing chassis 10. The opposing side surfaces of projection 32 can be also inclined to the reference plane 10 so as to form acute interior angles between the reference plane and the side surfaces.

In the illustrated embodiment, three edges with which tape 4 is contacted when it rides on front surface 45 of first edge guide 30 (the opposing sides and the lower side of front surface 45) are rounded so as to minimize damage to tape 4 when it rides on front surface 45. The lower sides of the opposing side surfaces of projection 32 can be also rounded.

In the preferred embodiment illustrated, second edge guide or flange 25 is provided with a hanging extention 46 which extends from the front end of the second edge guide toward reference plane 10 to thereby form a groove having a profile of an inverted U. Hanging extention 46 may prohibit the shifting off of tape 4 from second edge guide 45. It is necessary to have a gap between the lower end of hanging extention 46 and reference plane 10 which is larger than the gap between edge guide surface 31 of first edge guide 30 and reference plane 10. This makes it possible to prohibit tape 4 from contacting with hanging extention 46 of second edge guide 25 during loading operation.

It is possible to provide tape detecting means for tape guide block G1 and G2 to generate a signal when tape 4 is shifted off the guide path thereof. The generated signal can be utilized, for example, to turn off a power switch for the tape drive mechanism. For example, one or more openings 47 and 48 are formed on guide block 20 at cut away portion 26 behind first guide plane F1. A light sensitive device (not shown) can be inserted into the openings 47 and 48 to thereby detect shifting off of tape 4 therefrom.

It will be understood that first and second edge guides can be integrally formed.

It will be also understood that any known securing means such as screws or bolts and nuts can be utilized for securing guide block to chassis 10.

Although tape guide blocks G1 and G2 are shown to be secured to chassis 10 in the illustrated embodiment, it is possible to secure them to the immovable portion of cylinder 11 or to form them integrally with chassis 10.

Although the invention is described and illustrated with reference to a plurality of embodiments thereof, it is to be expressly understood that it is no way limited to the disclosure of such preferred embodiments but is capable of numerous modifications within the scope of the appended claims.

We claim:

1. A stationary tape guide, for use with a magnetic tape recorder having an inclined cylinder mounted on a chassis, the tape-guide comprising a guide block mounted on the chassis having;
   a first tape surface guide inclined with respect to a first reference plane;
   a second tape surface guide inclined with respect to the first reference plane and located further from the inclined cylinder than the first tape surface guide;
   a third tape surface guide oriented orthogonal to the first reference plane and located further from the inclined cylinder than the second tape surface guide;
   a first tape edge guide extending from the guide block beyond a second reference plane defined by the first and second tape-surface guides and having a first tape edge contact surface;
   a second tape edge guide extending from the guide block beyond a third reference plane defined by the first tape surface guide in cooperation with the cylinder, and having a second tape edge contact surface which is located further from the first reference plane than the first tape-edge contact surface.

2. A stationary tape guide as set forth in claim 1 wherein the first tape edge guide further comprises side surfaces extending from the first tape-edge contact surface in a direction away from the first reference plane and wherein said side surfaces are inclined with respect to the reference plane to thereby shift a tape which rides on the inclined surfaces back into the desired tape guide path.

3. A stationary tape guide as set forth in claim 2, wherein the edges formed between the first tape-edge contact surface and the inclined side surfaces are rounded to minimize damage to a tape when the tape rides on the inclining side surfaces.

4. A stationary tape guide as set forth in claim 1 wherein the tape surface guides are integrally formed with the guide block.

5. A stationary tape guide as set forth in claim 1, wherein the second tape-edge guide is provided with a downwardly extending portion at its front end so as to form an inverted U shaped groove, and the distance from the first reference plane to the lower end of the downwardly extended portion is equal to, or longer than the distance from the first reference plane to the first tape-edge contact surface of the first tape-edge guide.

6. A stationary tape guide as set forth in any of claims 3, 5, 1 or 2 wherein the guide block further comprises tape detecting means adjacent to the tape-guide path so that a signal is generated when the tape is shifted off the tape-guide path.

* * * * *